US012093329B1

(12) United States Patent
ElGamal

(10) Patent No.: US 12,093,329 B1
(45) Date of Patent: *Sep. 17, 2024

(54) USE OF PUBLISHED ELECTRONIC DOCUMENTS TO ENABLE AUTOMATED COMMUNICATION BETWEEN DOCUMENT USERS

(71) Applicant: LINKBOX, INC., a United States state of Delaware corporation, Houston, TX (US)

(72) Inventor: Ahmed Mohamed Hany Abdelalim ElGamal, Houston, TX (US)

(73) Assignee: LINKBOX, INC. A DELAWARE CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,282

(22) Filed: Mar. 2, 2022

Related U.S. Application Data

(63) Continuation-in-part of application No. PCT/US2020/062915, filed on Dec. 2, 2020, which is
(Continued)

(51) Int. Cl.
*G06F 16/93* (2019.01)
*G06F 16/13* (2019.01)
(Continued)

(52) U.S. Cl.
CPC .............. *G06F 16/93* (2019.01); *G06F 16/13* (2019.01); *G06F 16/164* (2019.01); *G06F 16/176* (2019.01); *G06F 16/951* (2019.01)

(58) Field of Classification Search
CPC ...... G06F 16/93; G06F 16/164; G06F 16/176; G06F 16/951; G06F 16/13
(Continued)

(56) References Cited

U.S. PATENT DOCUMENTS 7,904,333 B1 * 3/2011 Perkowski .......... H04L 61/4557
705/14.73
8,667,394 B1 * 3/2014 Spencer .................. G06F 16/93
715/224
(Continued)

FOREIGN PATENT DOCUMENTS

EP 3073390 A1 * 9/2016 ........... G06F 16/248

*Primary Examiner* — Hanh B Thai
(74) *Attorney, Agent, or Firm* — Stephen E. Zweig

(57) ABSTRACT

A system and method of using published electronic documents to create communications links between different readers and authors, as well as to connect readers of similar types of documents. The original documents may have been optically scanned paper publications, and thus need not initially contain any electronic metadata. These readers and authors may be previously unknown to each other. Here document readers use user-side software (either installed or web-based) on their computerized devices, and these, in turn, communicate with cloud servers running server-side software. Users indicate documents of interest and may assert authorship over some of the documents. The system automatically scans the documents, extracts authorship information, and can use this authorship information to establish electronic links between the readers and authors. Users can exchange comments and chat within the context of any given document, have this input relayed to authors or other users, and receive context-specific replies back.

21 Claims, 14 Drawing Sheets

Related U.S. Application Data a continuation-in-part of application No. 16/786,061, filed on Feb. 10, 2020, now Pat. No. 10,887,476.

(60) Provisional application No. 63/251,632, filed on Oct. 2, 2021, provisional application No. 63/157,116, filed on Mar. 5, 2021, provisional application No. 62/967,784, filed on Jan. 30, 2020.

(51) Int. Cl.
*G06F 16/16* (2019.01)
*G06F 16/176* (2019.01)
*G06F 16/951* (2019.01)

(58) Field of Classification Search
USPC .......................................................... 707/608
See application file for complete search history.

(56) References Cited

U.S. PATENT DOCUMENTS

| | | | |
|---|---|---|---|
| 10,887,476 B1* | 1/2021 | ElGamal | G06V 30/418 |
| 2007/0088671 A1* | 4/2007 | McElroy | G06F 16/93 |
| 2007/0130177 A1* | 6/2007 | Schneider | G06F 16/4393 |
| 2007/0150299 A1* | 6/2007 | Flory | H04L 63/20 |
| | | | 705/344 |
| 2007/0289022 A1* | 12/2007 | Wittkotter | H04L 63/123 |
| | | | 726/26 |
| 2015/0052427 A1* | 2/2015 | Vagell | G06F 16/176 |
| | | | 715/256 |
| 2017/0075976 A1* | 3/2017 | Garg | G06F 16/93 |
| 2017/0323273 A1* | 11/2017 | Meek | G06Q 10/1095 |

* cited by examiner

Fig. 6

| Sole Proprietorship vs. C Corporation vs. S Corporation | | | | |
|---|---|---|---|---|
| | Sole Proprietorship | C Corp | S Corp | Limited Liability (LLC) |
| Formation Requirements, Costs | Country Registration Assumed Name Notice | File articles of incorporation, state specific, filing fee required | Sames as C-Corp, plus S-corp Status request to IRS | File articles of organization, state specific, filing fee required |
| Personal Liability | Unlimited liability | Shareholders are not | Shareholders are not | Members are not typically held liable |
| Administrative Requirements | Relatively few requirements | Election of board of directors/officers, annual meetings, and annual report filing | Election of board of directors/officers, annual meetings, and annual report filing | Relatively few requirements |
| Management | Full control | Shareholders elect directors who manage business activities | Shareholders elect directors who manage business activities | Members can set up structure as they choose |
| Term | Terminated when proprietor ceases | Perpetual; can extend past death or withdrawal | Perpetual; can extend past death or withdrawal | Perpetual, unless state |

Q: Do you have a number for the LLC cost?

A: LLC costs around $500

⟲ Machine Learing Folder     ○ PDFs Created by Myself     ○ PDFs Created by Others 📄 Lightbulb Manufacturing Report no 1.pdf
📄 Lightbulb Manufacturing Report no 2.pdf
📄 Lightbulb Manufacturing Report no 3.pdf
📄 Lightbulb Manufacturing Report no 4.pdf
📄 Lightbulb Manufacturing Report no 50.p...

USE OF PUBLISHED ELECTRONIC DOCUMENTS TO ENABLE AUTOMATED COMMUNICATION BETWEEN DOCUMENT USERS

CROSS-REFERENCE TO RELATED DOCUMENTS

This application claims the priority benefit of U.S. provisional patent applications 63/157,116 filed Mar. 5, 2021, and 63/251,632 filed Oct. 2, 2021; this application is also a continuation in part of, and claims the priority benefit of, PCT/US20/62915 filed Dec. 2, 2020; PCT/US20/62915 was a continuation of U.S. application Ser. No. 16/786,061, filed Feb. 10, 2020, now U.S. Pat. No. 10,887,476 issued Jan. 5, 2021; U.S. Ser. No. 16/786,061 claimed the priority benefit of U.S. provisional patent application 62/967,784, filed Jan. 30, 2020, the entire contents of all of these applications are incorporated herein by reference.

BACKGROUND OF THE INVENTION

Field of the Invention

This invention is in the field of computerized document analysis and management.

Description of the Related Art

For centuries, scholars of all disciplines have used publications and reprints of publication to help disseminate information and to encourage commentary and feedback on these publications. As electronics and communications have advanced, although paper journals still exist, typically after the process of manuscript creation, review, and editing has been done, such papers are typically published in an electronic form, such as the popular .pdf or eBook formats, that allow the publications to be read on various types of computerized devices using various types of electronic document readers. Readers can often annotate such documents for their own purposes, but such annotations are usually specific to each reader's individual copy.

Some electronic document formats, such as certain pdf readers, allow users to add third-party software to the document reader in the form of a plugin. For example, Evermap Corporation produces an AutoBookmark Plug-in, with PDF linking functionality. This plugin allows users to insert links that can take the reader to other locations in the document they are reading, or to other locations such as different files and websites.

Various methods of automatically extracting information from published documents are also known in the art. These methods include the methods of Phempoonpanich and Zhao, "*Scraping the ACM Digital Library*, Donna Bergmark Cornell Digital Library Research Group, Cornell Computer Science Dept., *SIGIR Forum, Forum* 35(2), 2001, p. 7". Other approaches include the work of Auer et. al., "*Towards Facilitating Scientific Publishing and Knowledge Exchange Through Linked Data.* In: Bolikowski Ł., Casarosa V., Goodale P., Houssos N., Manghi P., Schirrwagen J. (eds) *Theory and Practice of Digital Libraries—TPDL 2013 Selected Workshops. TPDL 2013. Communications in Computer and Information Science*, vol 416. Springer, Cham.

BRIEF SUMMARY OF THE INVENTION

Although numerous document authoring systems have been described that enable multiple co-authors to collaborate on writing electronic documents, or mutually connected individuals to annotate and share documents, some problems still persist. For example, consider academic publications. An author, such as a postdoctoral fellow working at a first research institution, will often write a paper, perhaps preparing the manuscript in a first document format such as an OpenOffice format, Microsoft Word format, LaTeX, or other formats. This manuscript may be sent to a publisher, who may convert this manuscript to an alternative "parent" document format such as by printing in a paper-based journal, or electronic publication in the popular pdf format, one of the various eBook formats, and the like.

At a later time, perhaps years later, students or other researchers at other institutions may come across this published manuscript, create their own copies (such as by optically scanning a paper-based publication, or making an electronic copy of the publication in a different format, and create their own "similar" electronic copies of the original "parent" publication document. These "similar" electronic copies need not contain any electronic metadata, and will often not be bit-for-bit equivalent to the original parent electronic document.

The invention is inspired, in part, by the observation that readers of such similar electronic copies may often have questions regarding the contents of their similar copies. A quick electronically transmitted question to the author of the parent document, followed by a quick electronic response might resolve this issue. This, in turn, could greatly increase the productivity of the readers and might stimulate the authors towards further productivity as well. However, at present, this process is cumbersome. Although academic publications, for example, typically report the names of the authors, institutional affiliations, and some contact information, through the passage of time, the institutional affiliations and contact information may now become obsolete. The author may now be working at a different institution and may have entirely different contact information.

Consider the situation at present. A reader may have an electronic copy (a similar copy) of a publication (here called a parent document) on their computer. This reader may have a quick question that might be resolved in a one-minute electronic question and answer session. However, to ask this question, the reader must first do an electronic search for the author, and find their present institution and electronic contact information. The reader, who is most likely a stranger to the author, must send an unsolicited email or other electronic communication to the author identifying themselves, try to explain why their communication is "worthy", reference the publication, and perhaps include a screenshot of the section of the document to identify the context, and then pose the question. The process is time-consuming and cumbersome, which in itself discourages such attempts. Many authors tend to ignore communications from strangers, and must also wade through much extraneous verbiage before getting to answer the question itself.

The present invention is inspired, in part, on the insight, on the desirability of creating an automated computer-based method and system that would make it much easier to get into contact with the authors of a given publication, and/or other readers of a given publication, refer to particular portion of a document, and quickly post electronic questions and get answers. This invention should not require that the different users be working off of the exact same copies of a given document, nor should the invention require that the different users, and their electronic contact information, be previously known to one another. Further, the parent (or original) document itself, as well as the various similar copies, will not be assumed to be in an alterable form, and indeed may exist in a completely unalterable form (such as publications published on paper, such as various paper-based journals.

Although the invention can, in principle, work with a wide variety of different electronic formats, often the pdf (portable document format), or alternatively various eBook formats (e.g., EPUB, MOBI, AZW, IBA, DJVU, RFT, and other electronic formats), will be used as specific examples. Here the pdf format will often be used as a specific example, but this use should not be considered to be limiting.

As will be discussed, the invention provides a method and system for establishing electronic connections (or links) between various document readers of a similar copy of a parent document (e.g., readers of similar pdf copies of a parent document, such as a parent pdf document), and at least the authors of these parent documents. The method and system further can enable readers to then quickly and easily exchange comments, such as questions and answers, often within the context of the document itself.

BRIEF DESCRIPTION OF THE DRAWINGS

FIG. 6 shows how a first user can input a question into a first location of a document as at least their first user input, and the system will relay this at least first user input to a second user, such as an author of the document.

DETAILED DESCRIPTION OF THE INVENTION

In the following discussion, it will be useful to refer to various figures, such as FIGS. 1-7, which will be discussed in more detail shortly.

In this discussion, the user-side computers and computerized devices will typically desktop computers, laptop computers, tablet computers, smartphones, and even intelligent watches. All will typically have at least one computer processor, computer memory, and usually a graphical user interface capable of rendering at least a portion of the document being read, as well as receiving user input in the context of the document that is being read.

In this discussion, the internet server or system server will typically be a "cloud" type server, which can comprise multiple servers, memory, and at least one server processor per server. To simplify the language, the term server is generally intended to read on "at least one server", and the term computer processor is intended to read on "at least one computer processor". Both the user side computers and the invention's servers can communicate with each other over a computer system such as the internet. The invention's user-side software and server-side software will typically be run with the assistance of various operating systems, such as iOS, Windows, Linux, UNIX, and other type operating systems.

In some embodiments, the invention may be a method or system of using similar (e.g., often non-identical) copies of an original parent document (such as pdf parent documents) to create in-document network communications channels between a plurality of users. Here this invention will often be expressed in methods format, but this choice of language is not intended to be limiting. Similarly, the use of pdf documents as a specific example of an electronic document is also not intended to be limiting.

The invention will often operate by establishing internet links, in an internet server (110) (here an internet server is defined as meaning at least one internet server, which may often be a plurality of internet servers acting in a cloud server configuration) between a plurality of pdf documents such as (120-128). Assume here that at least some of these pdf documents (such as 120c) are similar pdf copies of a parent document (120p). The similarity between any two given documents (such as 120c, 120p) can be established by using at least one computer processor to scan by these various pdf documents, and to automatically determine which of those pdf documents (such as 120c) are similar pdf copies of a parent document (120p). This thus establishes which, of the various plurality of pdf documents (120-128) being examined, are similar pdf copies of a given parent document (e.g., 120c is a similar copy of 120p), to at least begin the process of creating internet links when such similarity is established.

Figure 1:
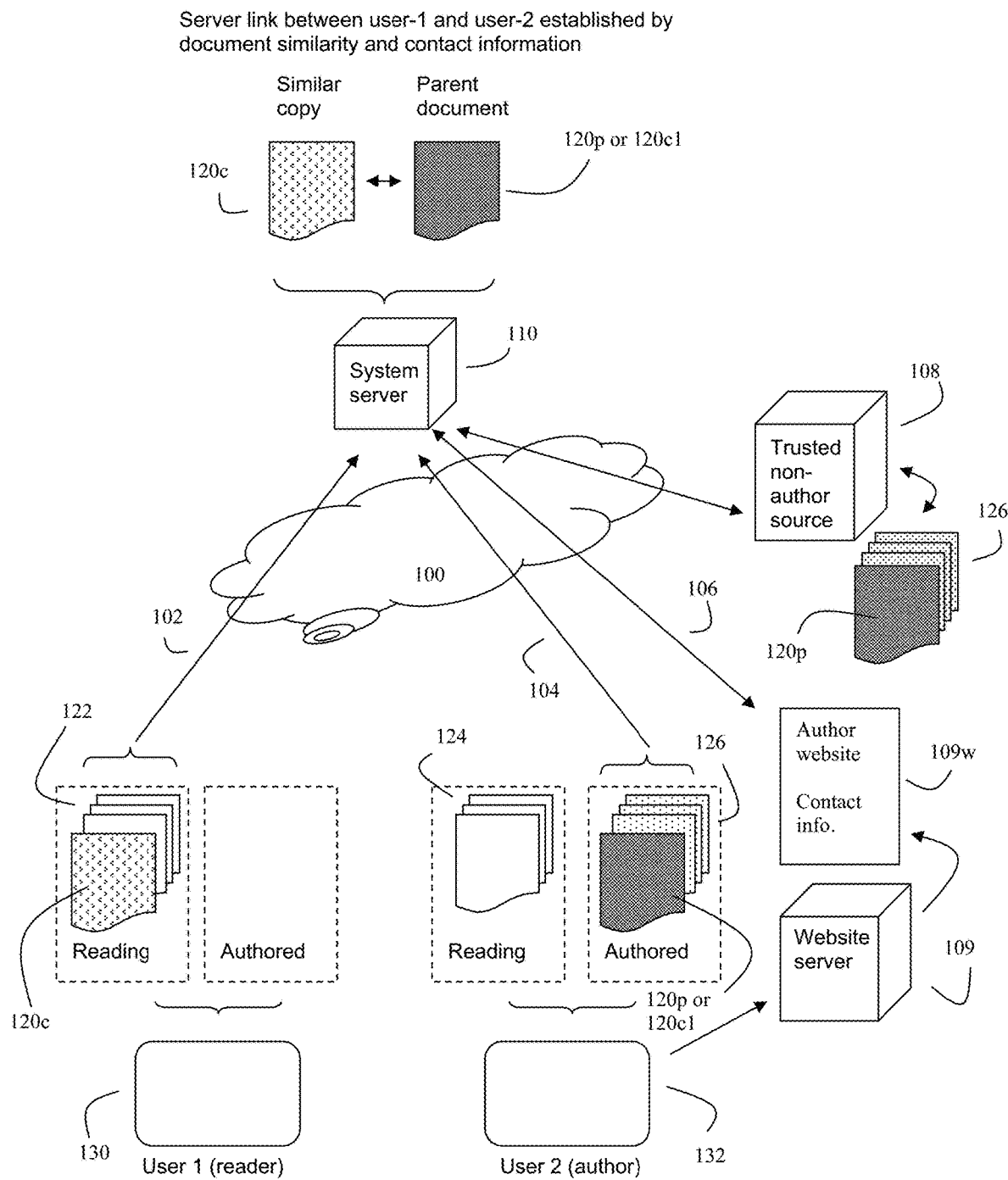
FIG. 1 shows some steps in the initial configuration of the invention.

Often, various documents, including similar copies of (120c) of a given parent document (120p) are stored as pdf document files in different user computerized devices. In FIG. 1, for example, one set of documents (122), and that includes a similar copy (120c) of a parent document (120p) is stored on a user-1 computerized device (130). Another set of documents (124, 126, including either a parent document (120p) or another similar copy (120c) is stored on a user-2 computerized device.

Figure 2:
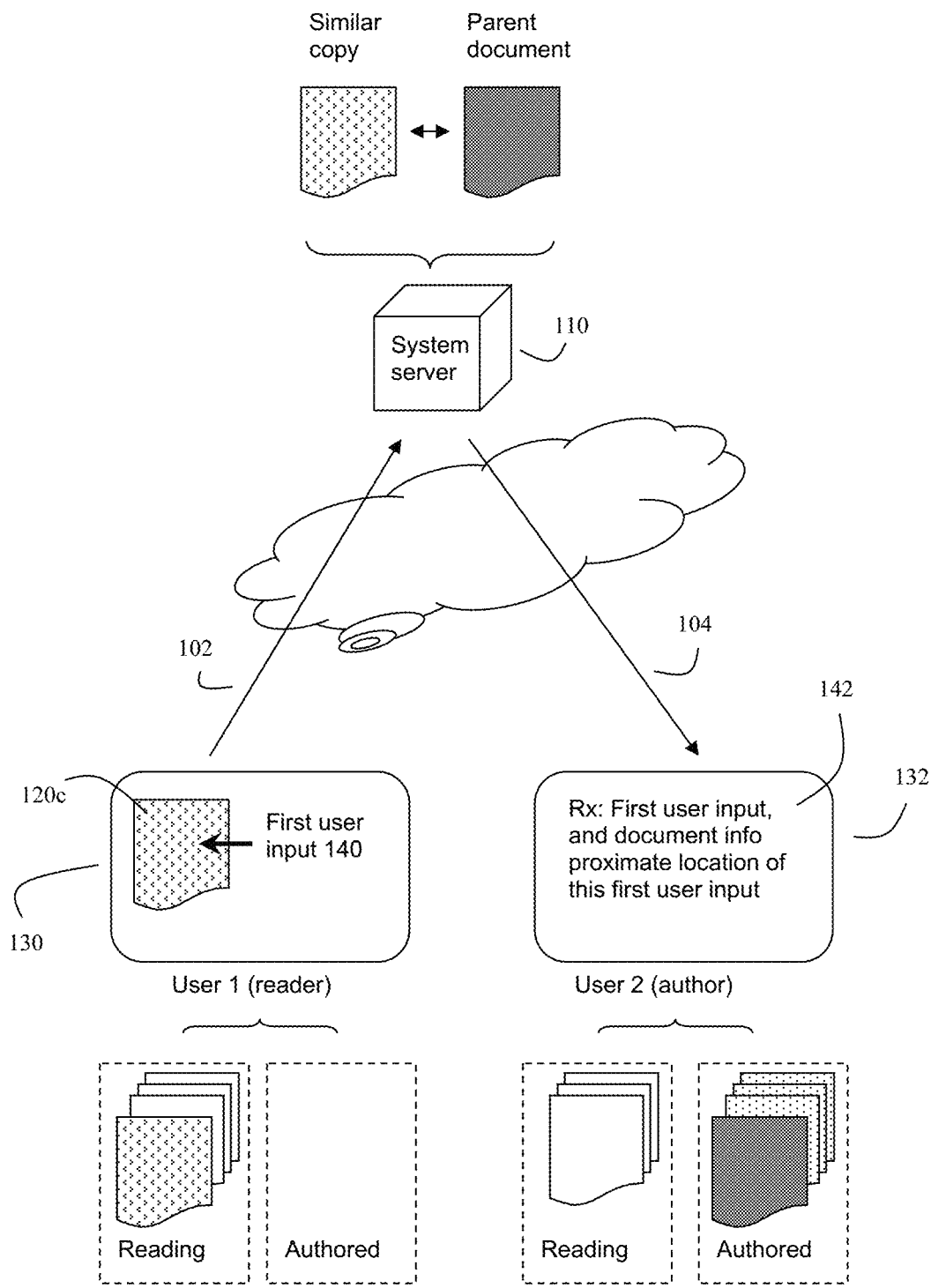
FIG. 2 shows how after the configuration process, a first user (user-1), who is reading a particular document placed in user-1's reading folder, can send document context annotated questions to that document's author (here user-2).

Turning briefly to FIG. 2, according to the invention, typically a similar copy (120c) of the same parent document (120p) will be run on a first user computerized device (130). Computerized device (130) will typically receive, at a first location (e.g., page, paragraph, table cell) of this similar pdf copy (120c), first user input (140) from a first user. This first location can be, for example, at a particular sentence, paragraph, table entry, and other specific location in the similar copy (120c). According to invention's methods, the invention will use these previously established internet links to transmit this first user input (140), and any of this first location and other optional information (such as a snippet from the similar pdf copy (120c) text proximate this first location) from the displayed version of the similar pdf copy (120c) that is proximate this first location, to a second user computerized device (132). In any event, this first location will usually be within one page (such as one pdf page) of the first user input.

Figure 3:
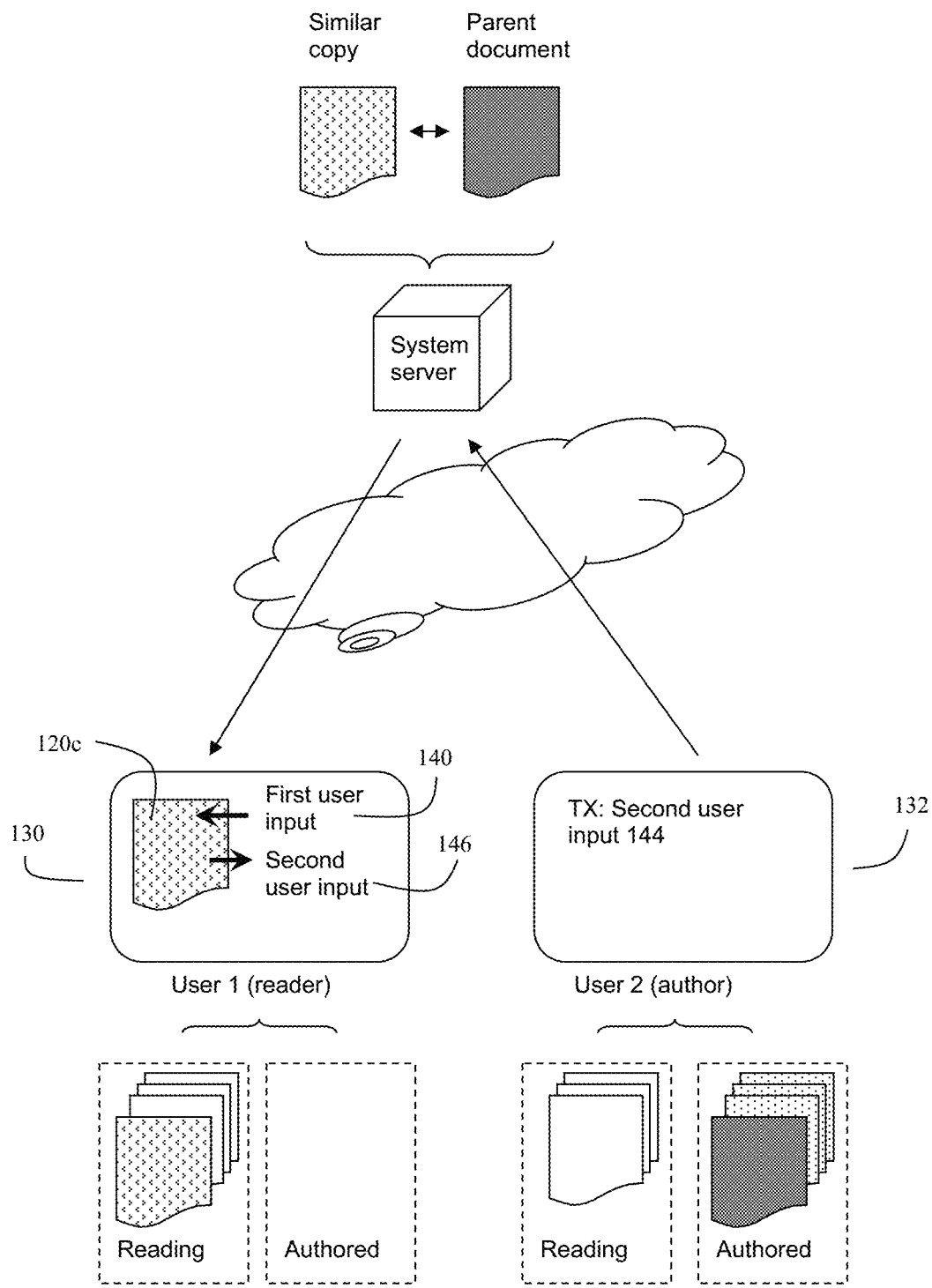
FIG. 3 shows that in some embodiments, the author could respond directly to user 1 without running any of the invention's user-side software on user-2's computerized device.
Figure 4:
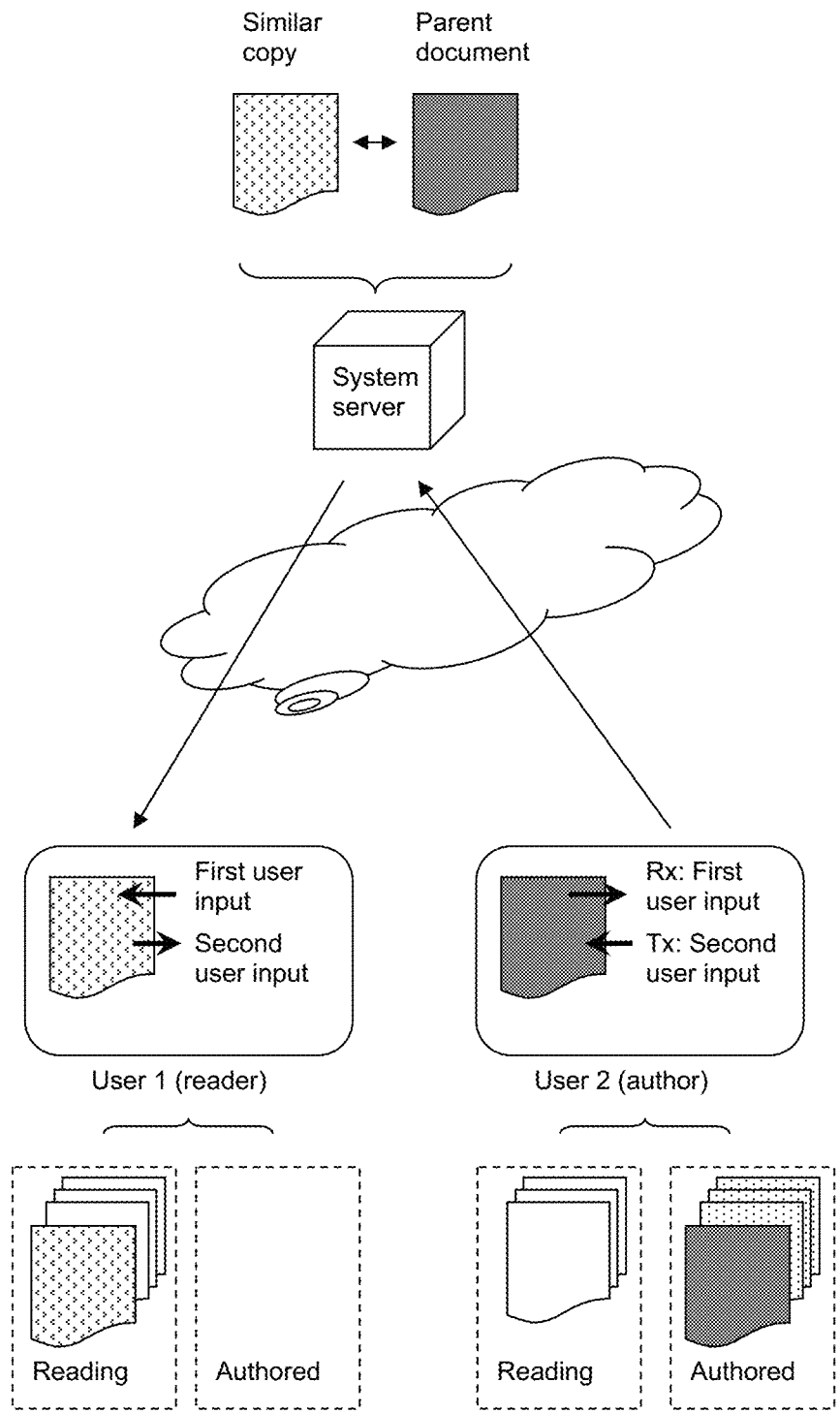
FIG. 4 shows that in an alternate embodiment, user-2 is now viewing their parent document on the invention's user-side software on their user-2 computer.

Turning briefly to FIG. 3 and FIG. 4, the method further teaches receiving at least second user input (144) on the second user computerized device (132), from a second user, and transmitting, using the previously established internet links, this at least second user input (144) to the first user using the first user computerized device (130); and displaying this at least second user input (entered as 144, displayed as 146) on the first user's computerized device (130). As will be discussed, in some embodiments, more input than just the second user input may be displayed.

FIG. 1 shows one embodiment of some of the steps involved in the initial configuration of the invention in more detail. In this example, a first user (user-1), who may be a student who has never authored any documents, but who may have a collection of various electronic documents, such as pdf documents (120c, 122), has installed the invention's user-side software (or plugin or app) on user-1's computer (130). In this example, user-1 has informed the invention as to which documents he might want to question others about by placing his collection of documents (120c, 122) into a "reading" computer file folder. In this example, his "authored" computer file folder is empty, indicating that user-1 does not wish to assert authorship over any of the various documents. See also FIG. 6 as another example of how such computer file folders may be labeled. Note that other methods for indicating interest, and asserting authorship, may also be used.

In FIG. 1, a second user (user-2) who is both reading various electronic documents (124) and who has also authored various documents (120p, 126), has also installed the invention's user-side software (or plugin or app) on to her (user-2's) computerized device (132). Specifically, user-2 has placed the documents that she is reading (124) in a corresponding "reading" computer file folder on her computer (132) and has placed the documents that she is asserting she has authored (120p, 126) into an "authored" computer file folder on her computer. Assume here that both user-1 and user-2 have entered in appropriate authorizations and contact information into their user-side software, and the invention's user-side software has communicated this to the invention's server-side software running on the internet server (system server) (110). The internet is shown as (100), and communications over various links between the server (100) and the various user computers and other computer systems (e.g., other servers) are shown by (102, 104, 106, and 108).

In some situations, as will be discussed in more detail shortly, often the first user (running computerized device 130) is a reader of a similar pdf copy (120c), and the second user is identified in the parent document (120p) as being an author of the parent document. However, there still may be a need to verify authorship, and/or make sure that the authorship contact information is correct, and also to confirm that the second user is willing to accept and answer at least a few questions regarding the parent document (120p).

Here, to do this, the second user (running computer 132) will typically inform or verify to the internet server (110) (often but not always by computerized device 132 and internet links (104) that the second user is an author of their various parent documents (126, 120p). The second user can also further provide their author contact information and author contact authorization to the internet server (110). According to this embodiment, at least one computer processor (which can be on computerized device 132, for example) identifies or finds this author identification information, and also transmits this author identification information to the internet server (110). The internet server (110) can then use this author identification information to at least verify that the second user is an author of the similar pdf copy.

To simplify operation, as previously discussed, in some embodiments, the first user (130) can identify which similar copies of pdf documents (120c, 122) are to be used to create these in-document network communications channels by placing these similar pdf copies into at least a reading file folder. Similarly, a user, such as a second user, can assert authorship of these similar pdf copies (such as 120c) by at least placing any of these similar pdf copies (120c1) or parent documents (120p) into an authorship file folder.

For some documents, the author may not be available. Further, in some embodiments, different non-author readers of a given similar document (120c) may also wish to use the invention to facilitate communication between the various different non-author readers of the one or more similar copies of a parent document (e.g., 120c, 120c1 . . . ). In this case, the second user is typically not identified in the various similar pdf copies (120c, 120cl) as being an author of the parent document (120p), and the second user (running computerized device 132) will typically not assert authorship of the parent document (120p). Here instead, the users may instruct the computer server (110) that it can more broadly establish links between different reader users, rather than between different document readers and corresponding document authors.

Figure 7:
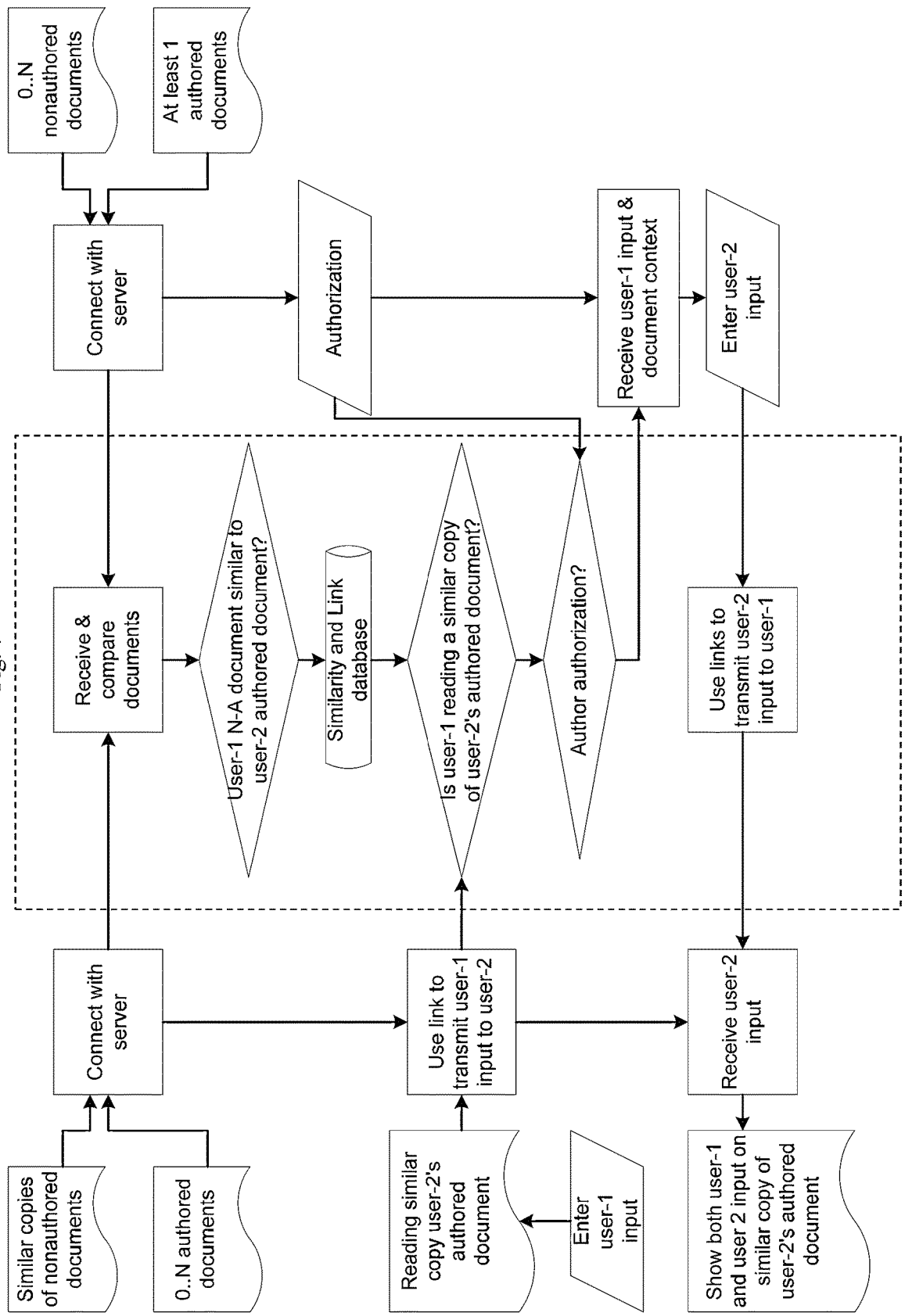
FIG. 7 shows an example, in flow chart format, of the invention's user-side software running on a user-1 computer (left side), invention's server-side software running on a system server, such as an internet cloud server (middle, dashed box), and an optional second copy of the invention's user-side software running on a user-2 computer (right side).

As shown in FIG. 1, and also in FIG. 7, in both cases, the user-side software (running on computer systems 130, 132) makes contact with at least one system server (110). Server (110) will be running the server-side of the invention's software (here called "server-side software"). Thus, as previously discussed, this server-side software thus typically will be running on at least one internet server (often called "the cloud"). For example, as will be discussed in more detail shortly, in FIG. 7, the user-side software from user-1 running on the user-1 computer (130) is running on the left side, the user-side software from user-2 running on computer (132) is running on the right side, and the server-side software running on server (110) is shown in the middle.

Any combination of user-side software and server-side software, running on any of the user computer processors, and the server computer processors, can be used to then scan the various documents in the various files. Although simple file comparison methods, such as computing hash functions may be used, often documents, in particular documents being read by any given user, may not be perfect copies of the original parent document as originally authored. For example, a parent document may have been originally created in a different electronic format, and then physically or electronically published in a different format. Indeed, some electronic documents that a given user may be reading may have originally been published in paper journals, and then optically scanned, producing pdf documents that merely contain images of the original parent publication.

In some embodiments, the scanning method will determine that there is at least a statistically significant correlation between at least visible sequences of alphanumeric characters between the similar pdf copy (120c) and the parent document (120p), or other similar copies (120c1). Thus, in a preferred embodiment, the invention will use robust scanning methods to identify and extract information from these various documents. These robust scanning methods may use optical character recognition methods, as needed to determine the underlying content of the various documents. These robust scanning methods may be further enhanced by the use of various artificial intelligence and/or software image recognition methods as needed. The goal of these scanning methods is both to determine which documents, to a high degree of confidence, can be considered to be highly similar to each other, what portions are similar, and also to attempt to extract information pertaining to the authorship, and optionally also author contact information (which often may become obsolete) of any given document.

For any given electronic document, such as a pdf document, links between a reader user, such as user-1, and an author user, such as user-2, can be established by one of two methods. In the most direct method, the author user (user-2) will, perhaps at the time of setting up the user-side software, also provide author contact information (e.g., email addresses, computer contact information and the like, as well as optional explicit confirmations of authorship (over and above placing authored documents into a suitable "authored" computer folder. In one embodiment, the user-side software (here running on user-2's computer) can transmit to the server-side software running on the internet server, for any given authored document, user-2's authorship information and latest author (user-2) contact information.

Optional Other Scanning Operations:

In addition to the above functions, scanning may also be used for automated PDF document identification and labeling. In some embodiments, the system software may also be configured to identify the type of document inserted from its content and give it a label. These labels may both specifically identify the document in being analyzed, and may optionally also determine the document "type" or "genre".

For example, if the user inserts a pdf copy of a GMAT Manhattan book into the reading folder, the system software may be configured to identify the document. In addition to identifying that particular document, the system may also identify the genre of the material as "GMAT Course Material". Similarly, a Geophysics research paper might also be assigned to a subtype of Geophysics genre.

Thus, in some embodiments, the scanning can further comprise analyzing at least some of the scan results using a search engine (for example, an online search engine such as Google, Bing, DuckDuckGo, and the like). When search engine hit results are obtained, also storing at least some of the search engine hit results in the internet server, thus automatically associating the similar documents with at least some of the search engine hit results. Applications of such online search "hit" results will be discussed later in this disclosure.

Regarding Internet Links:

In some embodiments, the system software, such as the server-side software, may create links by assigning UDI (Unique Document Identifier) for the various documents. Here, for example, each specific UDI can be linked to unique features in the parent document, such as the author's names, document title, abstract, lines on different pages, date of publishing, file size, and the like as desired. The mapping between the document UDI and the various document features can be stored on a cloud database, such as a database used by the internet server (110).

Although in some embodiments, document scanning may be done on each user computerized device, and the user computerized device may then merely transmit a briefer description of the locally stored document to the remote server (110), this need not always be the case.

In some embodiments, instead of scanning the various documents directly, the user-side software running on user computerized devices can instead create various cloud-lined folders which may, in turn, connect to the internet/system server (110). The server (110) can then read the contents of the documents on the reading and authored folders on the various user computerized devices directly. Either option may be employed.

Focusing on the embodiment where the document scanning is done at the internet/system server (110), which is the embodiment shown in FIGS. 1-4 and 7, after the various users have moved the various documents to the various cloud-linked computer file folders on the user computers, these documents are transmitted to server (110), and are further processed at server (110).

Returning to FIG. 1, let's assume that the user has a similar copy (120c) to a previously uploaded parent document or author's copy of a parent document (120p or 120c1), and the user-side software has automatically uploaded this copy to the server (110) using the internet (100), and the server-side software. The system server (110) now has both 120c and 120p (or 120c1) in its memory. Server (110) can scan newly uploaded similar copy (120c), and use the similarity between (120c) and (120cl or 120p) to establish that the connection link (such as a UDI) for both sets of files.

Thus, once a feature-search-match is formed, a connection (such as UDI based connection) can be created between user-1's document (120c) and user-2's document (120cl or 120p). With appropriate permissions and contact information, those readers (130) with similar documents can start entering their comments, questions and remarks on those documents (120c) and the document authors or other users (on 132) can use the system to start seeing these comments, and responding back.

To illustrate this point with an example: Assume that user-1 downloaded or scanned a research paper from a journal 4 years ago. Four years after this, user-1, and the author of the research paper (user-2) then configure their computers with the invention's user-side software. This user-side invention may be an app, program, or plugin to a document reader program or app, or indeed could in principle be embedded into the underlying operating system for the user's computerized device itself. For the purposes of this example, assume that both users are running personal computer systems that run a pdf reader program capable of accepting plugins, and that the user-side portion of the invention's software comprises at least a plugin for the pdf readers for user-1 and user-2.

When user-1 and user-2 start using the plugin, user-1 adds the pdf document (e.g., 120c) in the "reading" computer file folder (the name of this folder is not important, and this can be called other names, such as "created by others", for example. If user-2 is the author of the parent document, user-2 will add her copy of the parent document (120c1, or 120p) to the "authored" computer file folder (again this can be a different name, such as "created by myself"). Both plugins, running respectively on user-1's computer (130) and user-2's computer (132) can work with the server (110) to scan the documents, and in some embodiments assign suitable identification or links, such as UDI for user-2's and user-1's documents. As previously discussed, this UDI can be based on various comparison methods, such unique features in the document (e.g., author, title, abstract, lines on different pages, date of publishing, size, etc.)

Thus, for example, user-1 can use the plugin and server (110) to use the similarity results between document (120c) and the author (user-2)'s document (120c1, or 120p), and automatically create links between user-1's document (120c) and user-2's document (120c1, or 120p). Now, when user-1 wishes to comment on document (120c) regarding certain phrases, diagrams or tables on one of the pages of the document (120c), the invention will automatically transmit these comments to user-2. Similarly, user-2's response will be automatically transmitted back to user-1.

Cases where Authors are not Already Registered on the System:

It will often be the case, however, that the original author of a given document may not be registered with the internet/system server (110). In this situation, to make contact with such non-registered document authors, alternative methods may be used. As shown in FIG. 1, one such alternative method assumes that at least some documents (for example, 120p) and/or current author contact information are located on at least one trusted non-author source, such as a publisher server (108), or other trusted server (such as a company, university, or research institute web server 110).

In this alternative approach, the server-side software, running on the system server (110), may automatically "scrape" read, or otherwise download authorship information from the one or more trusted non-author sources (108), (110). This way, if user-1 wishes to contact the author of a particular document that user-1 is reading, the system server can use the authorship and author contact information from the one or more trusted non-author sources to contact the author (such as a potential user-2 who has not yet signed up), inform the author of the query, and invite the author, if interested, to install the user-side software on the author's computer. This author will then become user-2 for the purposes of this invention.

Put alternatively, in some embodiments, the first user (user-1, 130) can be a reader of a similar pdf copy (120c), and the second user (user-2) is identified this similar pdf copy (120c) as being an author of the parent document (120p). Using information obtained as a result of scanning this similar pdf copy (120c), at least one computer processor (running on any of 130, 132, or 110) obtains the author identification and transmits this author identification information to the internet server (110). Here, the server (110) can automatically scan at least one website (such as a university department website 109w provided by university web server 109) containing information verifying that the second user is an author of the parent document (120p), as well as website obtained (109w) second user contact information. The invention (for example, via server 110) can then use this website obtained second user contact information to automatically transmit a request to the second user (132) informing the second user about the identity of the first user (on computer 130), and/or the first user's user input (e.g., question, see FIG. 2, 140) and requesting confirmation that the second user is an author of the parent document (120p). The system will often be configured to require that the second user (132) transmit a confirmation to the internet server (110) confirming that the second user is indeed an author of the parent document (120p). Author contact authorization, if given, can also be transmitted to the internet server (110) as well.

Alternatively, or additionally, the parent document (120p) can be obtained from a trusted non-author source (108). This will often be the case if the author has not yet signed into the internet/system server (110).

As shown in FIG. 2 after the above configuration process, a first user (user-1), who is reading a particular document (120c) placed in user-1's reading folder, can send document context annotated questions (140) to that document's author (here user-2). Here, as previously discussed in some embodiments that user-1 may be using a pdf reader to read the document (120c), and this pdf reader may additionally contain user-side software such as a pdf communications plugin module, to read a given pdf copy of a document.

Note that in some embodiments, the invention may implement auto-file format conversion functionality. This may, for example, convert any arbitrary document format to a standardized document format, such as a pdf file format. In such an any-document file format to pdf file format auto conversion embodiment, if a user inserts a document file of a given initial arbitrary format into a reading or authorship folder, the system will automatically convert this document into a standardized format, such as a pdf format. Thus, for example, a user could drag a document in a .ppt or .docx format into a reading or authorship folder, and the system would automatically reconvert these documents into a standardized .pdf format.

For example, in this embodiment, after the documents are placed in either a reading file folder or an authorship file folder, at least when the documents are not already in the preferred standardized format (such as a portable document format (pdf), the system will further automatically convert the similar copies of these documents into the preferred format (such as pdf format) documents, thereby creating similar pdf copies of these documents.

In this example, assume that user-2 is the author of a document (120p) that was the parent (original version) of the similar pdf copy being read by user-1. User-1, who may have a question about a particular portion of his similar pdf copy, can enter in a at least first user input (such as a question 140) directly into his similar pdf copy (120c) (for example, by using a pdf plugin to receive user comments). The user-1 computer, using this user-side software, relays (102) this information (document being read 120c, comment location in the document), and the user-1 comment (140) to the system server (110). The server-side software running on the system server uses the previously established links to relay (104) this information to user-2 on the computerized device (132). As will be discussed, in some embodiments, more input than just this first user input may also be entered into the system, and subsequently displayed or otherwise output.

The system server (110) can relay this information in various ways. In the example shown in FIG. 2, the system server may simply send an email, text message, or another type of electronic message to user-2's computerized device (132). Here user-2 need not be running any of the invention's user-side software at this time, and user-2 need not be reading any documents at the time that the first user input (often a question 140) is sent. Server (110) can instead transmit this information to user-2 using email, SMS, social network or other electronic feed. This information can be used to prompt interested user-2 authors to either sign up for the invention's service (e.g., register with system server 110), and/or to start now running the invention's user-side software. This can be, for example, by starting a document viewer, which may contain the user-side software as a plugin.

Once user-2 is running the invention's user-side software and is running the document in question (such as 120p, or 120c1), user 2 can then often see user-1's input (question) in the context of the document as shown in FIG. 4. User-2 can then enter their response (second user input 144), and this reply can be seen directly by user-1 in the context of the document (120c).

Alternatively, if user-2 is not running the user-side software, but wishes to reply quickly anyway, using document context information that may have been sent by server (110) to further document the context of user-1's input, user-2 can instead reply using the same non-user side electronic messaging system, such as sending back a response email or response text message. Server (110) and user-1's user-side software can use the document context information to present this reply message (144) back to user-1, again in the context of the document (120p) as is shown in FIG. 3 (146).

FIG. 3 shows that in some embodiments, the author could respond directly to user 1 without running any user-side software on user-2's computer. For example, the author (user-2) could simply hit "reply" on an email message and include the second user input (e.g., answer the question). The server-side software and the user-1 user-side software could then take user-2's reply and the location information and present the user-2 reply in the context of the similar pdf copy being read by user-1. This makes it easier for user-1 to understand the reply (second user input).

Thus as shown in FIG. 3, in some embodiments, a document reader, such as a pdf reader, running on at least the first user computerized device (130) (130) further displays the second user input (44, 146) on the first user computerized device (130) at a location (146) that is either proximate the first location (140), or proximate a second location in the similar pdf copy (120c) designated by the second user (user-2), and transmitted by the second user computerized device (132) along with the second user input (144).

The above embodiment doesn't require that user-2 initiate running the invention's user-side software but has the drawback that because user-2 is replying (144) without having the parent document open in front of them, the user-2 input (reply) may not be fully optimal.

It will often be easiest for user-2 to accurately respond to comments if user-2 can see the other user's comments in their proper context in the underlying document (e.g., see them while running 120p or 120c1). This option thus deserves further discussion.

FIG. 4 shows that in an alternate and somewhat preferred embodiment, user-2 is now viewing their parent document (120p) on their user-2 computer (132). This parent document is similar to a similar document (120c) presently running on user-1's computer (130). Here, user-side software, running on both user-1 and user-2's computer, assisted as needed by the server-side software running on the system server (110), allow user-1 to pose questions (Tx: at least first user input 140) by typing into a displayed version of their similar copy of a given document, and this question can be viewed (Rx: at least First user input) by author user-2 in the context of user-2's parent document running (120p) on user-2's computer. Similarly, user-2 can answer this question (provide at least second user input, Tx: at least Second user input) by, for example replying in the same context (corresponding document location) in their computer (132), and the invention will relay this to user-1 where this response (at least Second user input) can be viewed, in context, on their similar copy of this document. As will be discussed, in some embodiments, additional inputs may also be received and displayed or otherwise output.

As previously discussed, the user-side software may comprise one or more software modules running on the user's computerized devices (130, 132). The user-side software may be an app or program that manages the various documents, displays the various documents on a graphical user interface, and also handles communications with the system server (110).

In some embodiments, such as where reader software, such as pdf reader software, eBook reader software, and the like are used to read the various files, the user-side software can comprise various types of plugin modules that can be embedded in, or otherwise interact with, the document reader software. Here, for example, a pdf reader running on the first user (user-1) computerized device (130), and perhaps the second user computerized device (user-2, 132) can further comprise a pdf communications plugin module. Here the method will use this pdf communications plugin module and the first user (user-1) computerized device to at least obtain first user input (1400 from a first user, and any of the first location and information from the similar pdf copy (120c) that is proximate this first user input location and transmit this to the internet server (110).

Figure 5:
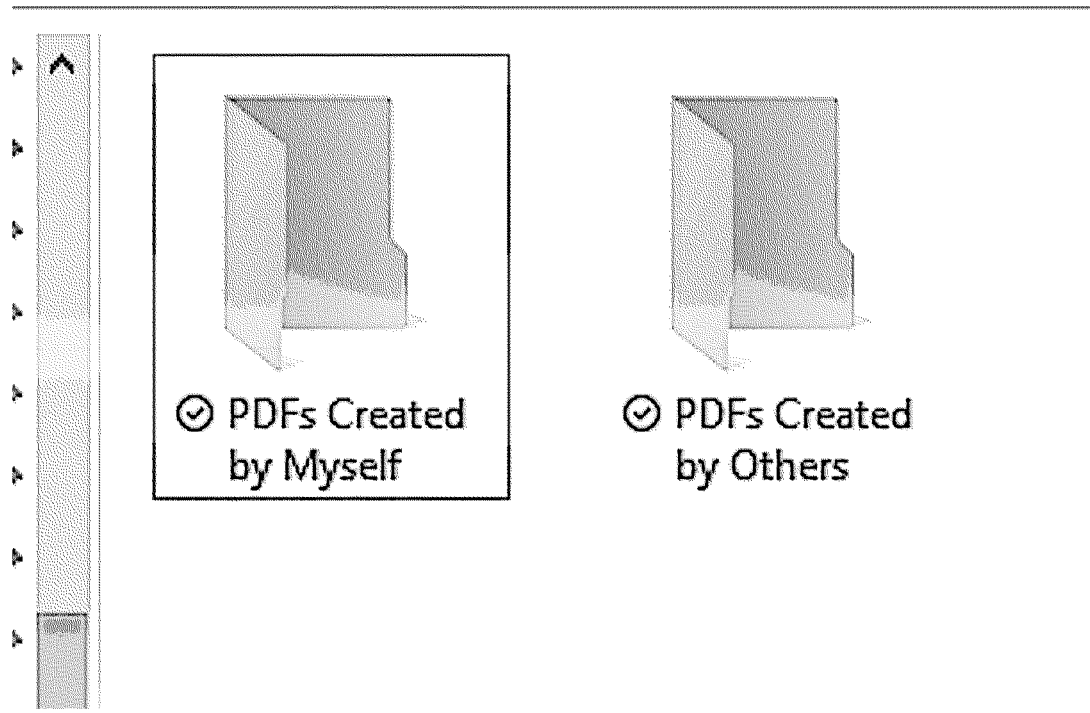
FIG. 5 shows an example of how a system user can place their document files into either an "authored" folder (e.g., the user authored that document) or a "created by others" folder (user is not an author) for subsequent automated analysis. Other folder types can also exist.

FIG. 5 shows an example of how a system user can place their document files into either an authored folder (e.g., the user authored that document) or a created by others (user is not an author) for subsequent automated analysis.

Here, for example, after installing the user-side software, the user-side software may automatically create a folder on the user's desktop that is connected over the internet (100) to internet/system server (110). This folder, in turn, may have various sub-folder categories. These can have descriptive names, as desired, such as (in the PDF file format example):

PDFs Created by Myself (or an "authored" folder)
    PDFs Created by Others (or a "reading" folder)
    PDFs I have expertise in (a third type of folder for non-authors who are asserting expertise with regards to the various documents).

The system may, for example, be configured to give users with documents in an expertise folder some ability to comment as well. Here safeguards, such as user feedback, the ability of authors to veto, etc. can be used by the system for quality control purposes. Some authors may also find it useful to authorize responses from qualified non-authors that the author trusts.

In some scenarios, users may sign up for the system by, either before or after registering with the system server (110), then installing the invention's user-side software (apps, programs, plugins, etc.) on the various user computerized devices. This registration process can include typical registration steps, such as creating usernames and passwords, emails, social media links, institutional links, and the like.

A document author can, for example, for any given document, begin the process of asserting authorship by placing a given document, preferably a parent document such as 120p, into the appropriate folder (e.g., an "author" or PDFs Created by Myself" folder) on their computer (132). Depending on system settings, the system may be configured to conduct further verifications of authorship, such as by comparing the author's account details with that listed in the document (120p) itself. Since authors can move to different institutions, and even change their names on occasion, the system can be configured to require additional verification when certain details do not match up.

As previously discussed, assume that a reader user, such as user-1, now adds a document to their "reading" or PDF Created by Others folder" on their computer (130), and wishes to ask a question (first user input 140) on one of the document's pages. However, the system informs the user that the author is unavailable (not registered on the system). Here the system options can include:

In a first option, which can also be a fallback option in case option 2 fails, the system may scan for any users who have at least asserted expertise over the same document, and not been vetoed by the real author. If some are found, the system will relay the question to the expert users (user-2), who placed the document in their expertise folder. Failing this, the system, if this option is desired by the user, may further determine if any other users at all have this document in their "reading/PDF created by others folder", and present this question to even to other users who may have merely placed a similar copy (120c, 120c1) in their "PDF Created by Others folder". So perhaps some sort of answer can be provided.

In a second option, at least the server-side software running on the internet/system server (110) can search user-1's pdf document (120c) for the author(s) by, for example, using keywords such as: written by, author, email, date, institution, ISBN number and so on. As previously discussed in FIG. 1, the system server (110) can search (possibly with the additional help of a third-party search engine) to find the latest email & or contact information of the various authors online at various third-party website servers (109) and web pages (109w). When a probable author and the latest contact information is found, the system server (110) can, as shown in FIG. 2, automatically contact the likely author by various electronic means (email, SMS, or another method), and inform the probable author about the user question, document, and context within the document.

The system can further offer the likely author a chance to sign up for the system and download the user-side software on the likely author's computer (132) to give a more complete response. However, since not all probable authors may be willing to download unknown (to them) software, the system server (110) can further offer the probable author a way to respond without downloading any user-side software. Here, for example, a probable author can merely reply to an email (as is shown in FIG. 2, and the server-side software, and the user-side software running on user-1's computer can attempt to insert the probable author's response (TX: second user input 144) in a nearby location (146) in the document (120c) being displayed on user-1's computer (130). The quality of the response may be lower, but this way the system can operate using only user-side software on user-1's computer (130), server-side software running on system server (110), and only standard software (such as email functionality) running on user-2's computer.

Of course, in the preferred embodiment, the probable author will install the invention's user-side software on their computerized device (132), see the user-1 question in the context of the displayed document (120p), and likely provide a better-quality answer, as was previously discussed in FIG. 4.

FIG. 6 shows how a first user can input a question into a first location of a document as their first user input, the system will relay this first user input to a second user, such as an author of the document. The second user can reply with a second user input (e.g., an answer) into their copy of the document. The system will relay this second user input (answer) back to the first user, and the answer can be displayed at or near the same first location on the first document.

FIG. 7 shows example flow charts of the invention running a first copy of the invention's user-side software on a user-1 computer (left side), server-side software running on a system server, such as an internet cloud server (middle, dashed box), and a second copy of the invention's user-side software running on a user-2 computer (right side).

Some embodiments of the invention may carry out some or all of the various functions described below, such as:

For better communication and personalized answers, the various reader users and author user accounts will typically have unique emails, usernames, ID, linked accounts, and in a preferred embodiment, also proof of identity;

A document author, such as user-2 can choose to disconnect some or all other users, such as user-1, at any time from some or the entire author user's various documents. Typically, when this happens, no comments will appear from the disconnected users).

A document author, such as user-2, can similarly only authorize input from certain users.

In some embodiments, the system will enable at least author users, such as user-2, to obtain data and statistics on the various reader users, such as user-1, that are reading and commenting on a given document, at least as authorized by the various users according to various privacy regulations.

The document author, such as user-2, can direct responses to all users reading the document, or an author designated subset of the users reading the document.

A document reader, such as user-1, can direct his input to any subset of users reading the document, document authors, or users asserting expertise with regards to the document.

All users can direct their respective inputs to have a limited lifetime, for a duration set by the user, or an unlimited lifetime.

Various quality control measures, such as user ability to flag comments as objectionable, designate some sections of a document as being off-limits for comments, and the like can also be implemented.

Artificial Intelligence and Statistical Analysis Methods

In some embodiments, any of the user-side software and the server-side software may be further configured with machine learning ability to scan and learn from the various documents, and to suggest answers on the author's behalf for at least some of the questions asked by the various users (this option can be turned on and off at the author's request). These automated responses can, for example, be based on automated summaries or statistical analysis of previous document question and answer sessions.

In some embodiments, which will be discussed in more detail in FIGS. 8A-D, and 9, the system can be configured to accumulate what other users have asked at the same location on a given document. These answers can be accumulated, optionally with the aid of machine learning techniques as desired, and these accumulated answers, or questions and associated answers, be displayed in the context of a given document on a user computerized device as well.

Put alternatively, in some embodiments, for each different document (such as a parent document 120p), the internet server (110) accumulates the first user input (140) and the second user input (144) over at least one set of previous first user inputs and second user inputs (and often a plurality of such inputs over at least a plurality of first users), and uses any of natural language processing and machine learning to provide various services such as:

Automatically generated server provided responses to at least some new first user inputs.

Previous second user responses in response to new first user inputs that are similar to previous first user inputs.

Previous first user inputs.

In these and other statistical and machine learning embodiments, the internet server (110) will often be configured to collect statistics on any of the various first users, second users, similar pdf copies, parent documents, first user inputs, and second user inputs.

In some embodiments, when a user, such as user-1, places his documents into a "reading" or "PDF Created by Others folder", the internet server (110) can treat this as a type of "smart dropbox", where the server (110), in addition to scanning the documents, also analyzes the documents and compiles statistics on the various similar type documents that other users are also reading on their computerized devices. These statistics can be used to provide interested users with immediate answers to various questions such as:

How many papers did this author write?

Show me the derivation of the paper's diffusivity equation

How many other documents does this document cite?

How many other documents cite this document?

Find all paragraphs (in this document, or other documents) talking about "the Jurassic age formations"

In this embodiment, internet/system server (110) can act much like a search engine, but here it would be searching those documents inside any of the "reading" or "authored" folders, plus questions and answers regarding these documents previously submitted by other system users.

Some examples of these various statistical and machine intelligence type applications are shown in FIGS. 8A-D, and 9.

Figures 8A, 8B:
FIG. 8A shows how in some embodiments, certain documents may be designated for machine learning assisted analysis by, for example, placing these documents in a separate machine learning subdirectory or folder. Other methods of designating a document for machine learning assisted analysis may also be used.
FIG. 8B shows an example of a plurality of related documents that have been designated for machine learning analysis and reporting.

In some embodiments, the user may instruct the system to apply machine learning techniques to various documents by placing the desired documents into a machine learning folder. These folders are shown in FIG. 8A, and an example of a set of related machine learning files (here lightbulb reports) are shown in FIG. 8B.

In this example, assume that a lightbulb manufacturer (here the corporation is the author) periodically issues production reports, perhaps on a daily or weekly basis. The reader user-1, who may or may not be affiliated with the manufacturer, has accumulated 50 copies of these reports previously shown in 8B.

In order for the machine learning methods to work, the machine learning algorithms must first be trained on a subset of the total set of documents, or at least one of these documents. In this simplified example, we will show how the user will train the machine learning algorithms on a first document, and the machine learning methods will then attempt to analyze all of the related documents according to this training.

Figure 8C:
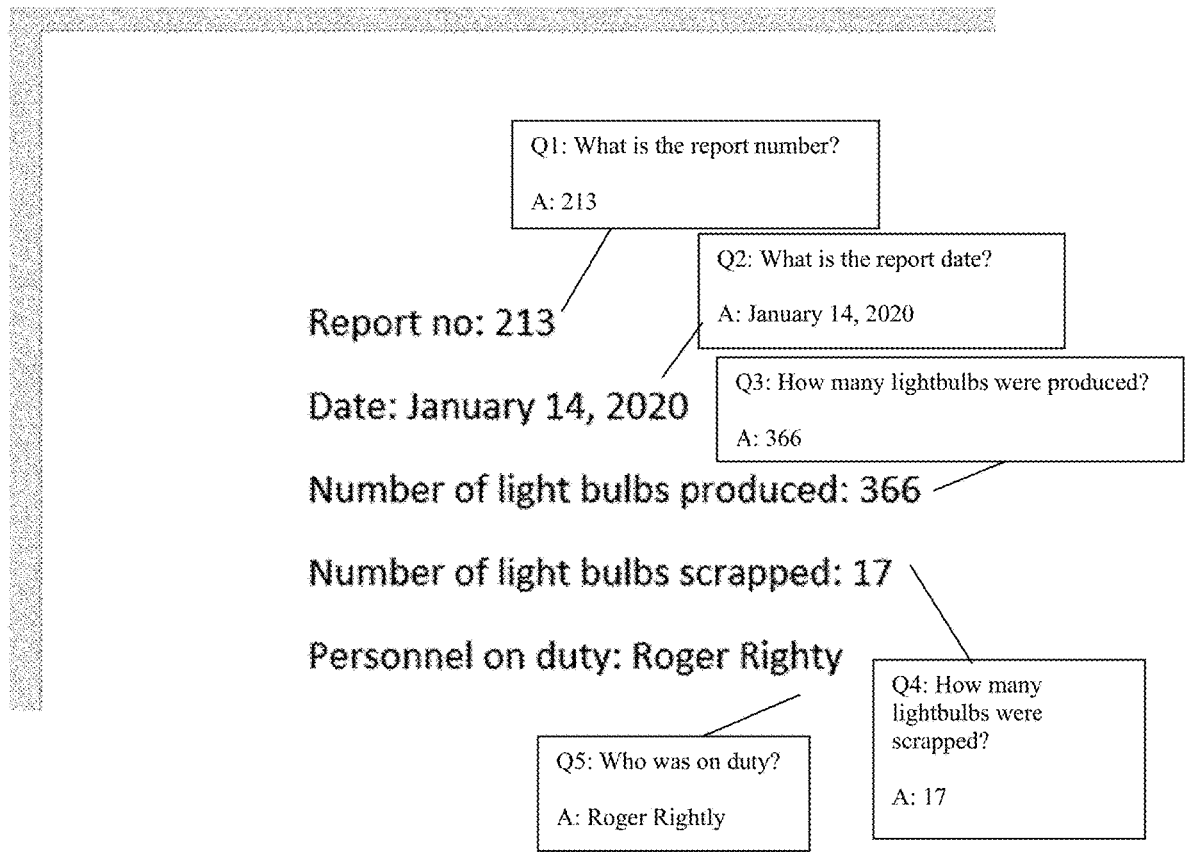
FIG. 8C shows how a user can use a subset of those documents designated for machine learning analysis to train the system's machine learning system. In this simplified example, a user is training the machine learning system by annotating a first lightbulb manufacturing report document with various questions and answers. To a human, these may appear obvious, but these are instructing the machine learning system as to what outputs are acceptable given various user questions as inputs.

FIG. 8C shows an example of how users can annotate a subset of the selected documents with, for example, various user questions (sometimes with more than one type of phrasing), and instruct the system as to the appropriate answer to provide, given the user question and the user-selected document field as input. These machine learning training annotations can then be used to train the invention's machine intelligence software. These can include user-provided training questions, and document location selectors such as:

Q1: What is the report number? (given the user-selected document field as input)—A: 213

Q2: What is the report date? (given the user-selected documented field as input)—A: Jan. 14, 2020

Q3: How many lightbulbs were produced? (given the user-selected documented field as input)—A: 366

Q4: How many lightbulbs were scrapped? (given the user-selected documented field as input)—A: 17

Q5: Who was on duty? (given the user-selected documented field as input)—A: Roger Rightly Here, the system will use the fact that the document is in the machine learning folder to understand that the annotations are intended to be used for machine learning training purposes. Other methods of indicating to the system that certain annotations or comments are intended for machine learning training purposes can also be used. For example, specifically designated machine learning training annotations can be used.

Figure 8D:
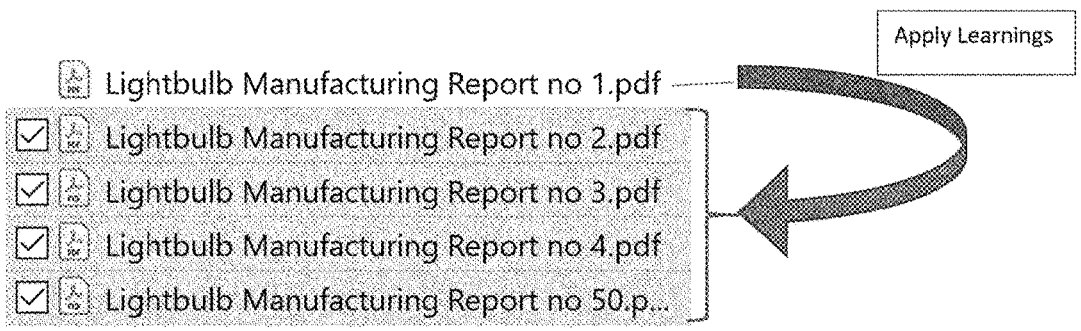
FIG. 8D shows how the invention's machine learning methods apply the training (learnings) from a first training set of documents (here report no. 1) to other related documents (reports 2-50).

In particular, FIG. 8D shows an example of how the system can apply the machine learning training comments from a subset of the various documents (such as report number 1) to then analyze the other documents (such as documents 1-50) according to the machine learning training set. After accumulating statistics over these 50 copies, the system server (110) can use natural language processing and statistics or machine intelligence to now automatically answer certain questions from the users.

Figure 9:
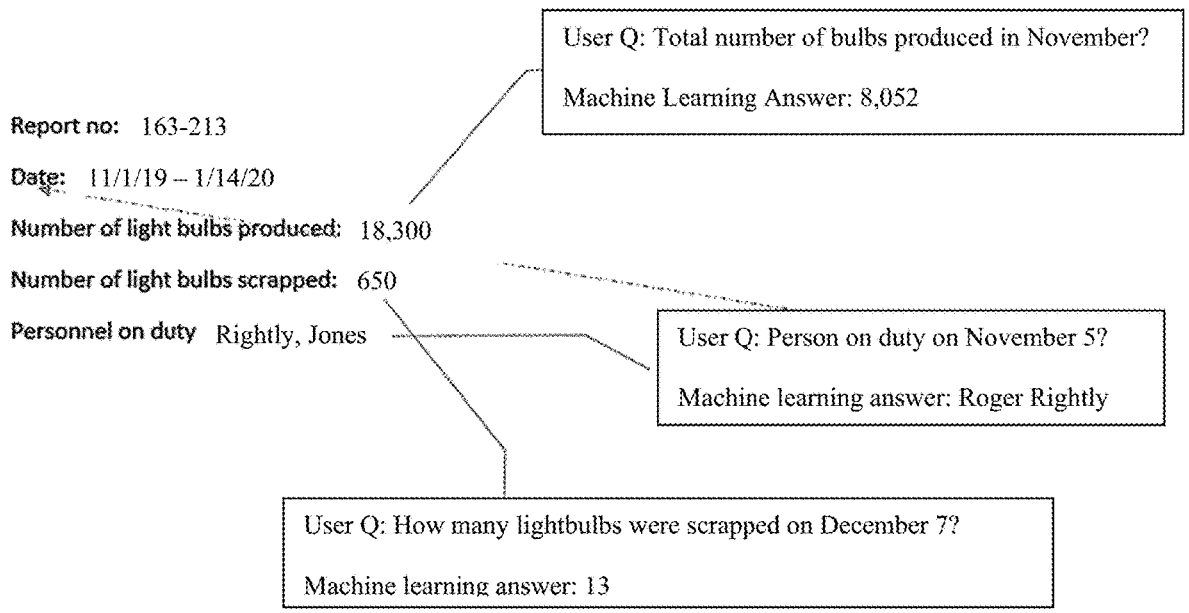
FIG. 9 shows an example of how, after training, the system can automatically respond to various user inputs (questions) and use the full set of documents (documents 1-50) to automatically answer at least some of these user questions.

FIG. 9 shows an example of how, after training, the system can automatically respond to various user inputs (questions) and use the full set of documents (documents 1-50) to automatically answer at least some of these user questions. Here, users can pose a question such as: when was the highest light bulb produced, or how many days has Roger worked, or when was the lowest amount of bulbs scrapped, and the system can use the accumulated data and natural language processing to automatically answer at least some of these questions.

Put alternatively, in some embodiments, the system can be configured to use machine learning/artificial intelligence, and natural language processing methods to quickly respond to user questions without the user having to manually access the various underlying documents. The system can further be configured to further analyze such data according to various system-installed or user-selected algorithms.

Thus, at least after training, the system can automatically respond to various user questions such as: "When was the highest light bulb produced?", or "How many days has Roger worked?", or "When was the lowest number of bulbs scrapped? by automatically searching all of the files that correspond to the question, and automatically extract the answer.

In some embodiments, the user can then validate the system generated answer, or alternatively reject, in which case the system may be configured to take any of the user acceptance or rejection as further machine learning training information. This can allow the system to learn from its mistakes, and gradually improve as it obtains more experience answering user questions.

For example, consider the following user responses to the system's attempts to answer user questions. Here, after every answer, the system also automatically asks the user for feedback as to if the user was satisfied with that answer. A positive user response will further train the system to keep using that particular type of response, while a negative user response may cause the system to attempt to generate some alternate answers to see if some better alternatives can be found.

USER Q: When was the lowest number of bulbs scrapped?
Machine intelligence answer 1: 2020—(Is this what you are looking for Yes/No?)
USER: NO
Machine intelligence answer 2: Nov. 13, 2020—(Is this what you are looking for Yes/No?)
USER: YES The system can then use these responses to train its machine learning system to return the dates in a month, day, year format, rather than just in a year format.

In some embodiments, the system can also be configured to apply this "user training" from a first set (or subset) of documents to other related documents. For example, the system can be configured to apply the above training to any document in the machine learning folder (or otherwise designated for machine learning purposes) that has the word "lightbulb" in its file name.

Thus, to summarize, in this embodiment, the user (either the first or second user) can further designate at least some documents (such as pdf documents, which can be any of parent documents and similar documents) as machine learning documents, and either the first user or the second user can further annotate a subset of these machine learning documents. This produces the annotated subset of machine learning documents discussed above. In this embodiment, the system can use this annotated subset of these machine learning documents to train a machine intelligence system, thus producing a trained machine intelligence system. The system can then use this trained machine intelligence system, these machine learning documents, and the internet server to automatically generate server provided responses to at least some new first user inputs (or second user inputs as well).

Other features and embodiments of the invention include:

In some embodiments, users (readers) can connect with other readers of a given document, and see other user's comments on different document pages during reading.

Authors can "electronically autograph" documents as requested by various readers.

Groups of users can use a given document as a basis to mutually share ideas. In some embodiments, the system server (110) can be configured to accumulate these ideas, and compile these ideas into either an annotated version of the original parent document or as a separate user-comments document.

Users can also enter in system directives in the form of user comments or other commands. These system directives can include reminders to reopen documents at a given time and date, or to contact the author or other readers at a given time and date.

User Interface Enhancements

Figure 10:
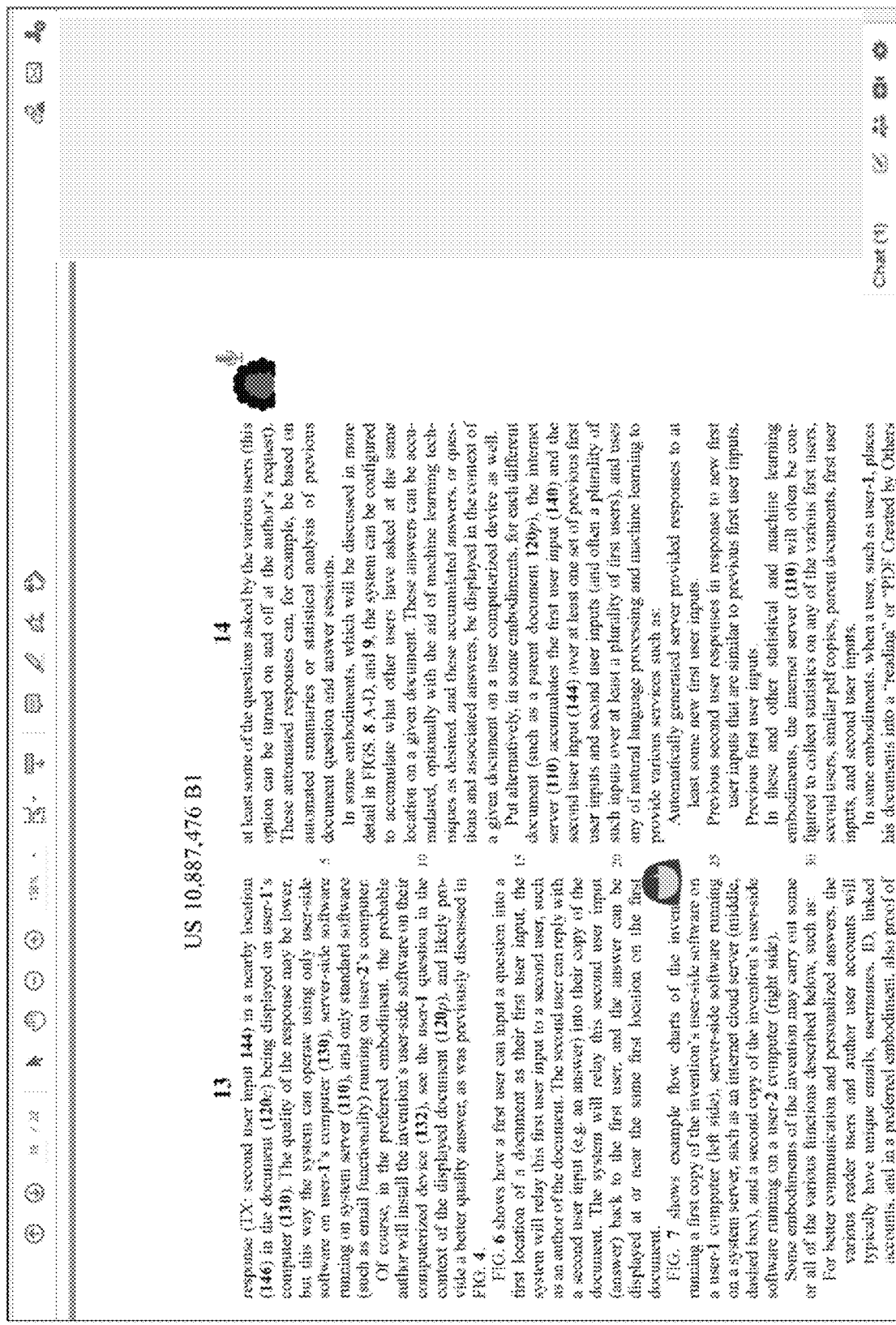
FIG. 10 shows how in some embodiments, the system can also display icons or other types of images (e.g., pictures or even video) of pictures of the various users commenting on a given document with their texts and different replies.

FIG. 10 shows how in some embodiments, the system can also display icons or other types of images (e.g., pictures or even video) of pictures of the various users commenting on a given document with their texts and different replies. For example, the system may be configured to show the document with various user questions and replies annotated as floating of icons, faces or avatars of the various users on the document. For example, these user icons may be placed around a certain area where the user comments are displayed. Users may elect to only receive questions from certain users. Users may also ask to follow certain accounts for at least some of their various questions.

Figure 11:
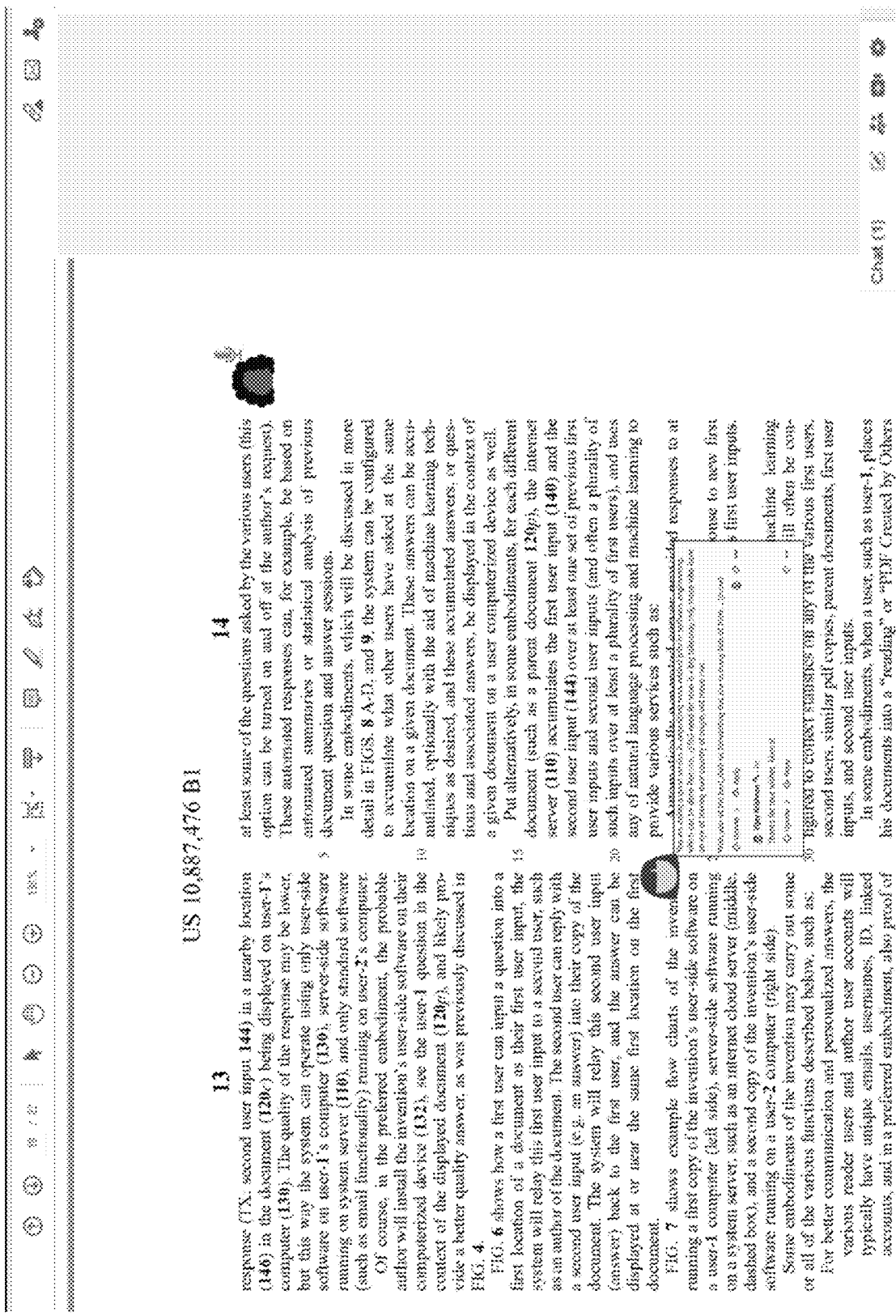
FIG. 11 shows a variation of the embodiment shown in FIG. 10. In this embodiment, the system is configured so that at first only icons from other users (with comments or questions) are shown.

FIG. 11 shows a variation of the embodiment shown in FIG. 10. In this embodiment, the system is configured so that at first only icons from other users (with comments or questions) are shown. When these icons are selected, the details questions or comments from a given user associated with that icon, at least in the context of that part of the document, can then be revealed.

Figure 12:
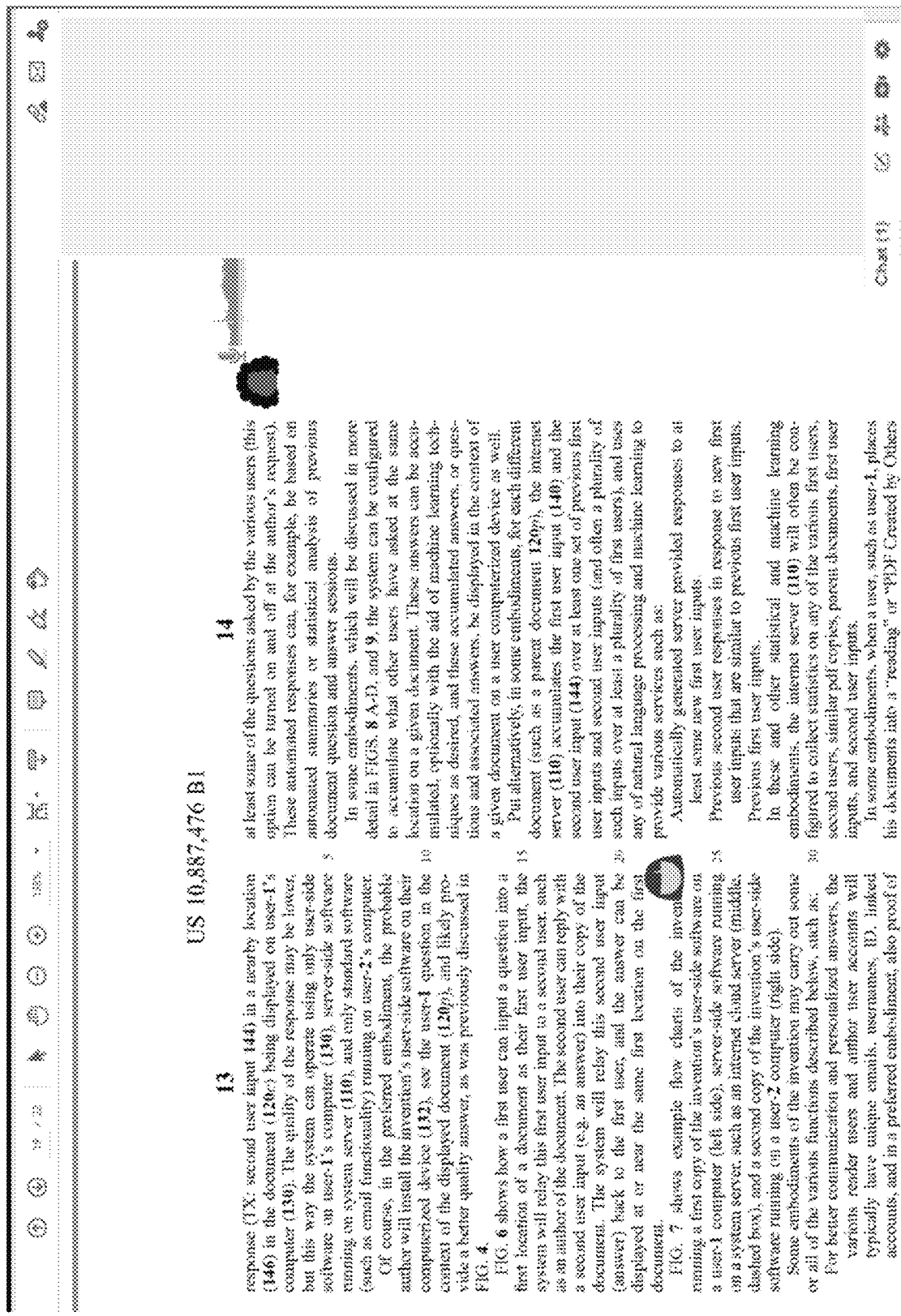
FIG. 12 shows another variation of the embodiment shown in FIG. 10. In this embodiment, the system is configured so that the user's may, in addition to text, also append audio (or even video) questions or comments to a given section of the similar document.

FIG. 12 shows another variation of the embodiment shown in FIG. 10. In this embodiment, the system is configured so that the user's may, in addition to text, also append audio (or even video) questions or comments to a given section of the similar document.

Figure 13:
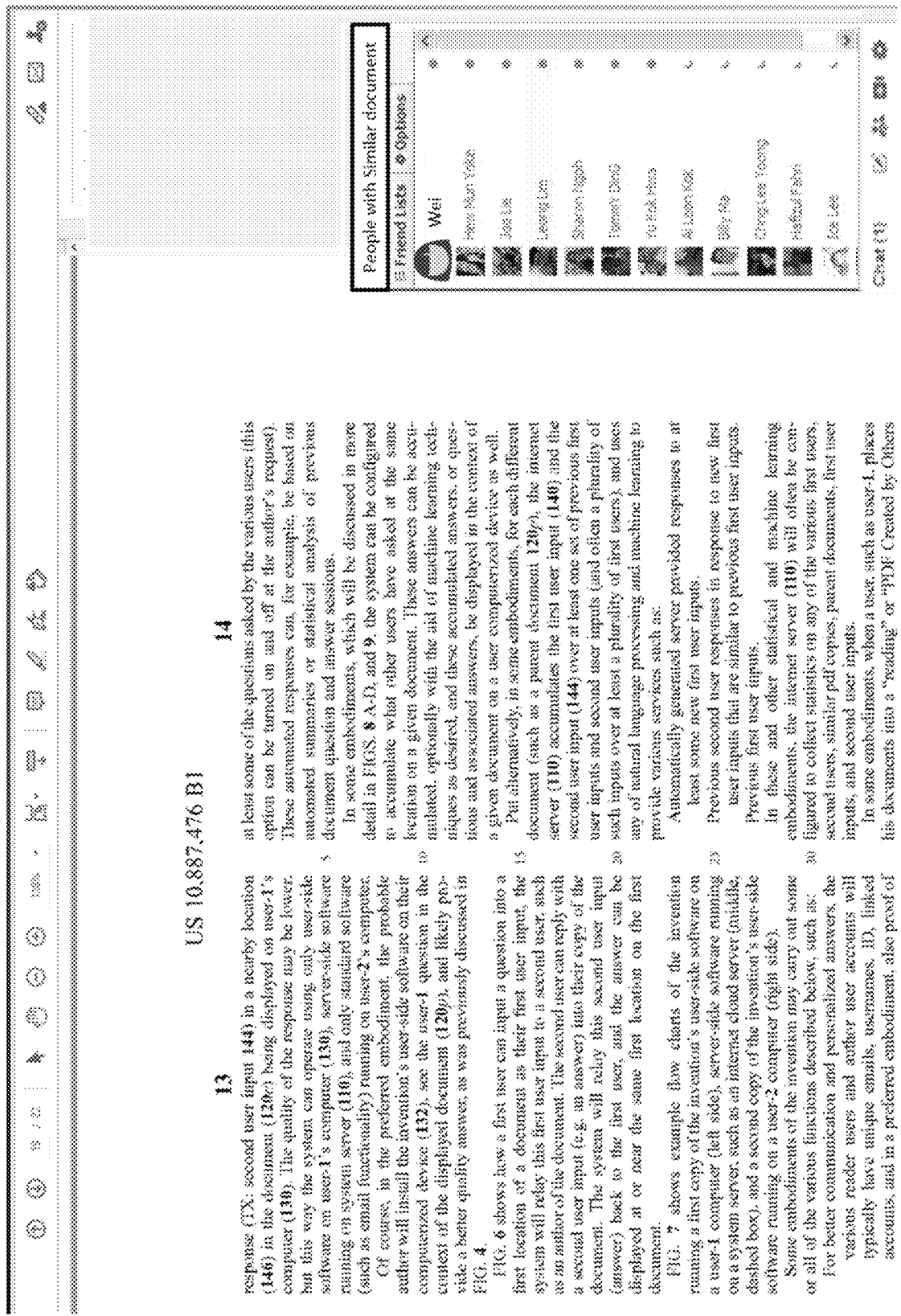
FIG. 13 shows another embodiment that implements chatbox functionality as well.

FIG. 13 shows another embodiment, where the system may be configured to implement one or more chatboxes as well (one here shown in the lower right corner.) These chatboxes can be configured to, for example, link and show users who also have similar copies of the document presently being examined. Some chatboxes may, for example, show the user status (online or not, available for discussion, or not) of uses who have similar copies. The system may also be configured to enable either instant or non-real time text, audio, or video links with these other users.

Thus, in some embodiments, the at least first user input can further comprise any of a first user icon, first user audio messages, or input from other users directed towards the same section of a similar document. Alternatively, a given similar document may also display a chatbox comprising a list of other users having in the similar document, and any of text, audio, or video chat links with other users having (or working on) similar documents. The first user input may also be used in a similar chatbox displayed to other users.

Similarly, in some embodiments, the at least second user input can further comprise any of a second user icon, second user audio messages, and input from other users directed towards the same section of the similar document. The system may also implement one or more chatboxes comprising a list of other users having the similar document (and incorporating input from the first user), and chat links with other users having (or working on) similar documents.

User Voting

In multi-user configurations, where a plurality of users are working on a same similar document, and providing questions, answers, or comments, it may be further useful to implement a voting system that enables the user group as a whole to upvote or downvote questions, answers, or comments that the group considers to be particularly good or bad. Thus, in some embodiments, input from other users directed towards the same section of the similar document may further comprise user upvotes and downvotes on the input from other users.

Connecting Users and Documents by Document Genres

In some embodiments, the previously discussed document scans may be used to help connect users that are working with different similar documents together, when these different similar documents all fall within the same genre type.

For example, assume that user "X" is working with (reading) similar pdf documents a, b, c, and d, while user "Y" is working with (reading) different similar pdf documents a, b, and c. Here assume that the system has previously determined, by scanning and optional search engine or database lookups, that all of these documents fall within the same "genre". The system could then be configured to analyze the genre types, determine that user "Y" lacks document "d" held by user "X", and inform user "Y" about the existence of document "d" (perhaps by showing a document cover, document name, or other document information), and that another user on the system has this document. With appropriate permissions, the system can then suggest or allow user "Y" to contact user "X" and perhaps request document "d", or at least transmit messages concerning document "d".

As another example taken from the field of chemical engineering, assume that a first chemical engineering researcher "Dr. Z" has research papers a, b and c on the system, and a second chemical engineering researcher "Dr. M" has only research papers a & b on the system. The system software may be configured to recognize that papers a, b, and c are from the same "subclass of chemical engineering" genre. Here, the system may be configured to automatically suggest paper c to "Dr. M.". The system can again also facilitate communication and possibly document c exchange between "Dr. M." and "Dr. Z".

In some embodiments, the system may also be configured to fingerprint or identify users according to the genres of the various documents they have placed on the system. This "document genre fingerprint" can, in some embodiments, be further used to connect these users with other users with similar document genre fingerprints.

In this embodiment, assume that John, Lee & Aly are global students all taking the TOEFL English exam, and instructor Miss Joanna is a TOEFL mentor that is looking for students to teach. If John, Lee & Aly al insert their different TOEFL PDFs documents into the system, the system can scan the documents, look up in search engines or databases, and identify and label the documents as being in the TOEFL material genre. The system can then assign students John, Lee, and Ali to the TOEFL document genre fingerprint. If instructor Miss Joanna either selects and interest in the TOEFL document genre herself, or uploads similar TOEFL document to also be classified as having a TOEFL document genre fingerprint, then the system can be configured to allow instructor Miss Joanna to either advertise her TOEFL tutoring expertise to students John, Lee, and Ali, or otherwise enable various types of contact between the TOEFL students and the TOEFL instructor.

Thus, in some embodiments, at least some of the previously discussed search engine results may be used to classify at least some of the similar documents according to genre, and then also further automatically associate at least some of the similar documents according to genre. (Here, assume that at least some users are same genre users who have entered non-similar documents of the same genre.) Here, the system can be configured to automatically determine which of these users are same genre users, and automatically create links between at least some of these same genre users.

Using Machine Intelligence to Generate Automated Questions and Answers

In some embodiments, the system may be configured to use scans of similar documents as to further search online databases (e.g., Google, Bing, DuckDuckGo, and the like.) As previously discussed, these searches can be used to identify document genre. Additionally, such search engine searches can be used to identify "hits", such as previously posed questions or answers regarding the similar documents, as well as the sources (e.g., points of contact) of these previously posed questions and answers. These "search engine hits" questions, answers, and sources (points of contacts) need not originally be within the system itself, so long as these can be identified using other search engines. In some embodiments, the system may be configured to automatically annotate (at least upon user request) similar documents with such search engine derived outside questions, answers, and contacts.

Put alternatively, in some embodiments, the document scanning may further comprise analyzing any of at least some of the scan results and search engine hits using any of natural language processing and machine learning, and determining, using the search engine hits, answers to questions regarding the similar documents. The system may also provide at least some of these questions and answers to the users, as well as contact information regarding the source of at least some of these questions and answers.

The invention claimed is:

1. A method of using similar copies of parent documents to create network communications channels between a plurality of users comprising at least first users and second users, said method comprising:

establishing internet links, in an internet server, between a plurality of documents;

said documents being already published and fully edited;

at least some documents being similar copies of a parent document that are not bit-for-bit equivalent to the original parent document, at least some said similar copies lacking electronic metadata associating said similar copies with any said second users, by scanning, using at least one computer processor, said plurality of documents, and determining which of those documents are similar copies of said parent document, thus establishing which of said plurality of documents are similar copies of said parent document, and creating said internet links when similarity is established;

wherein said similar copies of said parent document are stored as document files in different user computerized devices;

running, on a first user computerized device, a similar copy of a same parent document on a reader;

using said internet links, and said at least one computer processor, to establish network communications channels (in-document network communications channels) with at least some second users, wherein at least some in-document network communications channels are initially unknown to said first users, said second users, and said at least one computer processor;

receiving, at a first location of said similar copy, at least first user input from a first user as a document annotation, and using said internet links to transmit at least said first user input, and any of said first location to a second user computerized device;

receiving second user input on said second user computerized device, from a second user, and transmitting, using said internet links, at least said second user input to said first user as a document annotation using said first user computerized device; and displaying at least said second user input on a graphical user interface of said first user computerized device.

2. The method of claim 1, wherein at least one of said first users (a first user) is a reader of said similar copy, and at least one of said second users (a second user) is identified in any of a similar copy or a parent document as being an author of said parent document;

wherein said second user informs said internet server that said second user is an author of said parent document, and further provides author contact information and author contact authorization to said internet server;

wherein at least one said computer processor then identifies author identification information, and also transmits said author identification information to said internet server; and said internet server uses said author identification information to at least verify that said second user is an author of said similar copy.

3. The method of claim 2, wherein said first user identifies which similar copies of documents are to be used to create in-document network communications channels by placing said similar copies into at least a reading file folder; and wherein said second user asserts authorship of said similar copies by at least placing any of said similar copies or said parent document into at least an authorship file folder.

4. The method of claim 3, wherein after said documents are placed in either said reading file folder or said authorship file folder, when said documents are not portable document format (pdf) documents, further automatically converting said similar copies of documents into pdf documents, thereby creating similar pdf copies of said documents.

5. The method of claim 1, wherein at least one of said second users (a second user) is not identified in said similar copies as being an author of said parent document, and where said second user does not assert authorship of said parent document.

6. The method of claim 1, wherein said reader running on at least said first user computerized device further comprises a communications plugin module; and using said communications plugin module and said first user computerized device to at least obtain at least first user input from a first user, and any of said first location and information from said similar copy that is proximate said first location, and transmit this to said internet server.

7. The method of claim 1, wherein said at least first user input further comprises any of a first user icon, first user audio messages, input from other users directed towards the same section of said similar document, and a chatbox comprising a list of other users having said similar document, and any of text, audio, or video chat links with said other users having said similar documents.

8. The method of claim 7, wherein said input from other users directed towards the same section of said similar document further comprises any of said other user upvotes and downvotes on said input from other users.

9. The method of claim 1, wherein a reader running on at least said first user computerized device further displays at least said second user input on said first user computerized device at a graphical user interface location that is either proximate said first location, or proximate a second location in said similar copy designated by at least one of said second users (a second user), and transmitted by said second user computerized device along with at least said second user input.

10. The method of claim 1, wherein said at least said second user input further comprises any of a second user icon, second user audio messages, input from other users directed towards the same section of said similar document, and a chatbox comprising a list of other users having said similar document, and chat links with said other users having said similar documents.

11. The method of claim 1, wherein said scanning is done by determining that there is at least a statistically significant correlation between at least visible sequences of alphanumeric characters between said similar copy and said parent document.

12. The method of claim 11, wherein said scanning further comprises performing optical character recognition on at least said similar copy.

13. The method of claim 1, wherein said scanning further comprises analyzing at least some of said scan results using a search engine, and when search engine hit results are obtained, also storing at least some of said search engine hit results in said internet server, thus automatically associating said similar documents with at least some of said search engine hit results.

14. The method of claim 13, wherein at least some of said search engine results classify at least some of said similar documents according to genre;

further automatically associating at least some of said similar documents according to genre;

wherein at least some users are same genre users who have entered non-similar documents of a same genre;

further automatically determining which of said users are same genre users, and creating links between at least some of said same genre users.

15. The method of claim 13, wherein said scanning further comprises analyzing any of at least some of said scan results and said search engine hits using any of natural language processing and machine learning, and determining, using said search engine hits, answers to questions regarding said similar documents, and providing at least some of said answers to said users, and/or contact information regarding a source of at least some of said answers.

16. The method of claim 1, wherein said first location is within one page of at least said first user input.

17. The method of claim 1, wherein, for each different parent document, said internet server accumulates said first user input and said second user input over at least one set of previous first user inputs and second user inputs, and uses any of natural language processing and machine learning to provide any of a) automatically generated server provided responses to at least some new first user inputs;

b) previous second user responses in response to new first user inputs that are similar to previous first user inputs;

c) previous first user inputs.

18. The method of claim 1, wherein at least one of said first users (a first user) is a reader of said similar copy, and at least one of said second users (a second user) is identified in at least said similar copy as being an author of said parent document;

wherein at least one said computer processor then identifies author identification information, and also transmits said author identification information to said internet server;

automatically scanning, using said internet server, at least one website containing information that said second user is an author of said parent document, and obtaining unverified author contact information for an unverified author from said at least one website;

using said unverified author contact information to transmit a request to said-unverified author informing said unverified author of any of said first user and first user input, and requesting confirmation that said unverified author is a verified author of said parent document;

wherein said unverified author transmits a confirmation to said internet server that said unverified author is a verified author of said parent document, and further provides author contact authorization to said internet server.

19. The method of claim 1, wherein said parent document is obtained from at least one trusted non-author source.

20. The method of claim 1, further designating at least some documents as machine learning documents;

obtaining any of first or second user annotation of a subset of said machine learning documents, thus obtaining an annotated subset of said machine learning documents;

using said annotated subset of said machine learning documents to train a machine intelligence system, thus producing a trained machine intelligence system; and a) using said trained machine intelligence system, said machine learning documents, and said internet server to automatically generate server provided responses to at least some new first user inputs; or b) using said trained machine intelligence system to scan at least some of said similar documents, and propose questions for at least some of said users to answer and discuss.

21. The method of claim 1, wherein, at least after conversion, all parent documents and similar documents are portable document format (pdf) parent documents and pdf similar documents.

\* \* \* \* \*